United States Patent [19]

Kagohata

[11] Patent Number: 5,530,885

[45] Date of Patent: Jun. 25, 1996

[54] CONTROLLER FOR CONTROLLING A SYSTEM IN A CAR, INCLUDING A SINGLE CHIP MICROCOMPUTER, AND AN APPARATUS FOR DEVELOPING A CONTROL PROGRAM FOR THE MICROCOMPUTER

[75] Inventor: Tsuneo Kagohata, Ibaraki-ken, Japan

[73] Assignee: Hitachi, Ltd., Tokyo, Japan

[21] Appl. No.: 386,622

[22] Filed: Feb. 10, 1995

Related U.S. Application Data

[63] Continuation of Ser. No. 128,270, Sep. 29, 1993, abandoned, which is a continuation of Ser. No. 578,213, Sep. 6, 1990, abandoned.

[30] Foreign Application Priority Data

Sep. 18, 1989 [JP] Japan .................................. 1-240082

[51] Int. Cl.[6] ..................................... G06F 15/78
[52] U.S. Cl. ............... 395/800; 364/424.08; 364/431.05; 364/232.8; 364/222.40; 364/DIG. 1; 62/158
[58] Field of Search ..................... 395/800, 775, 395/500, 425, 375, 275, 800; 364/130, 136, 138, 191, 424.01, 424.05, 426.04, 431.04, 431.05, 431.09; 62/157, 158, 231, 244

[56] References Cited

U.S. PATENT DOCUMENTS

| 4,016,545 | 4/1977 | Lipovski ............................. 340/172.5 |
| 4,274,265 | 6/1981 | Okumura ................................ 62/158 |
| 4,325,118 | 4/1982 | Devita et al. ........................... 395/425 |
| 4,695,737 | 9/1987 | Rabon et al. ............................... 307/31 |
| 4,730,256 | 3/1988 | Niimi et al. ........................ 364/413.12 |
| 4,839,795 | 6/1989 | Iwaksaki ................................. 395/275 |
| 4,937,772 | 6/1990 | Chavez et al. ...................... 364/715.01 |
| 4,972,368 | 11/1990 | O'Brien et al. .......................... 395/375 |
| 5,113,500 | 5/1992 | Talbott et al. ........................... 395/325 |
| 5,134,700 | 7/1992 | Eyer et al. ............................... 395/425 |
| 5,150,024 | 9/1992 | Kimura et al. ....................... 318/568.1 |
| 5,206,572 | 4/1993 | Farag et al. ............................. 318/778 |

FOREIGN PATENT DOCUMENTS

| 58-118413 | 7/1983 | Japan . |
| 59-133648 | 8/1984 | Japan . |

OTHER PUBLICATIONS

"Latest Microcomputer Technology Reader", Kogyo Chosakai Publishing Co., Ltd. 1977, Printed in Japan.
Difference between References Cited in the Argument and the Present Invention (English Translation).

Primary Examiner—Mehmet Geckil
Assistant Examiner—Alpesh M. Shah
Attorney, Agent, or Firm—Antonelli, Terry, Stout & Kraus

[57] ABSTRACT

A car built-in type one-chip microcomputer including a ROM, a RAM, and an input/output port, wherein a control program which is executed on the car built-in type one-chip microcomputer is stored in a high level language, so that formation, change and verification of a control program can be easily carried out by an ordinary programmer who has never been trained to treat an assembly language. Even if the kind of the microcomputer is changed, it is not necessary to change the control program. The program can be modified as a result of experiment. A program developed by a program developing apparatus can be used, as it is compatible with the microcomputer.

15 Claims, 11 Drawing Sheets

FIG. 1

$tdo = 40. + Ka * ta - Kz * Zm + Kr * (ts - tr);$
$return(tdo);$

```
OprTdo    ldd     #Ka
          Std     Param 1
          ldd     Ts
          Std     Param 2
          bsr     Mul 10
          ldd     #40
          Subd    MulAns + 1
          Std     Tdo ldd     #Kz
          Std     Param 1
          ldd     Zm
          Std     Param 2
          bsr     Mul 10
          ldd     Tdo
          Subd    MulAns + 1
          Std     Tdo ldd     #Kr
          Std     Param 1
          ldd     Ts
          Std     Param 2
          bsr     Mul 10
          ldd     Tdo
          addd    MulAns + 1
          Std     Tdo
          rts
```

FIG. 7B

| | | |
|---|---|---|
| Mul 10 | Clr | MulAns |
| | Clr | MulAns + 1 |
| | lda | Param 1 + 1 |
| | ldb | Param 2 + 1 |
| | mul | |
| | Std | MulAns + 2 |
| | lda | Param 1 + 1 |
| | ldb | Param 2 |
| | bsr | MulSub 10 |
| | lda | Param 1 |
| | ldb | Param 2 + 1 |
| | bsr | MulSub 10 |
| | lda | Param 1 |
| | ldb | Param 2 |
| | mul | |
| | addd | MulAns |
| | Std | MulAns |
| | rts | |
| Mulsub 10 | mul | |
| | addd | MulAns + 1 |
| | Std | MulAns + 1 |
| | lda | #0 |
| | adca | MulAns |
| | Sta | MulAns |
| | rts | |

```
ContComp    ldd    Ta
            Std    Work
            ldx    #Work
            bsr    HysChk
            lda    Flag
            Sta    OPort
            rts
```

FIG. 11B

*List 5

```
HysChk      lda    Flag
            bita   #BComp
            bne    HysChk10
            ldd    0,X
            addd   #Hys
            bra    HysChk20

HysChk10    ldd    0,X
            Subd   #Hys
HysChk20    bpl    HysChk30
            lda    Flag
            anda   #^BComp
            bra    HysChk40

HysChk30    lda    Flag
            ora    #BComp
HysChk40    Sta    Flag
            rts
```

FIG. 12

```
if (flag & bcomp)
     ta += Hys;
elss
     ta -= Hys;
if (ta)=0,)
     flag |= bcomp;
elss
     flag &=^bcomp;
```

FIG. 13

$Tdo = 40, -Ka * Ta - Kz * Zm + Kr * (Ts - Tr)$

FIG. 14

```
IF  LAND(Flag, BComp) THEN
        Ta = Ta + Hys
ELSE
        Ta = Ta - Hys
ENDIF
IF  Ta>=0. THEN
        Flag = LOR(Flag, BComp)
ELSE
        Flag = LAND(Flag, LNOT(BComp))
ENDIF
```

FIG. 16

```
fd = Open("/oport", 1);
Write(fd, *flag, 1);
Close(fd);
```

F I G. 15

CONTROLLER FOR CONTROLLING A SYSTEM IN A CAR, INCLUDING A SINGLE CHIP MICROCOMPUTER, AND AN APPARATUS FOR DEVELOPING A CONTROL PROGRAM FOR THE MICROCOMPUTER

This application is a continuation of application Ser. No. 08/128,270, filed Sep. 29, 1993, now abandoned, which is a continuation of application Ser. No. 07/578,213, filed Sep. 6, 1990, and now abandoned.

BACKGROUND OF THE INVENTION

The present invention relates to a car built-in type one-chip microcomputer and a program developing apparatus for developing a program for such a car built-in type one-chip microcomputer.

Microcomputers are used in cars for ignition and fuel control for engines, air conditioner control, transmission control, active suspension control, brake control, etc., and it is general that a car built-in type one-chip microcomputer is provided for exclusive use for every control function. For example, Japanese Patent Publication No. Sho-63-11169 discloses such a car built-in type one-chip microcomputer for use for air conditioner control, a control program for the car built-in type one-chip microcomputer being formed in accordance with an electronic circuit designed for control. Such a control program for a car built-in type one-chip microcomputer is generally stated in an assembly language (or a machine language). This is mainly for the following two reasons:

(1) The limitation in capacity of memories (ROM and RAM), is severe; and (2) A high processing speed is required.

As for the reason (1), the requirement to reduce the cost of car parts is extremely strong, and, therefore, as microcomputers inexpensive 4-bit or 8-bit car built-in type one-chip microcomputers have been used. However, only a small capacity of ROM and RAM can be incorporated in a one-chip microcomputer because of the limitation in the degree of integration of the car built-in type one-chip microcomputer, and it is necessary to state a program in an assembly language so that the program could be minimized and the RAM could be used effectively, in order to satisfy a necessary control specification. If other ROM and RAM are additionally provided on another external chip in order to avoid the limitation of the memory capacity, it becomes necessary to prepare a space for an addressing IC, a wiring pattern on a printed circuit board for connection between the chips, and so on, in addition to the space for the additionally provided ROM and RAM, resulting in an increase in the number of parts, an increase in the size of the control circuit, and an extreme increase in the cost.

As for the reason (2), on the other hand, the processing speed is relatively low in the conventional microcomputer, and, therefore, as the number of steps of a program increases, the time required for one round of a main program becomes longer, and the response property of a control system becomes more deteriorated. The time taken for one round of a main program is affected by a configuration system of an interruption processing program, and in not a few cases it takes about 0.5 seconds actually for one round of a main program. Also in order to improve the response property of a control system, accordingly, it was required to reduce the number of steps for one round of a program to as small a number as possible, and it was necessary to use an assembly language by which the program could be minimized and a high processing speed could be obtained.

On one hand, an assembly language has an advantage that the program to be executed can be made compact so that the memory capacity can be reduced and the processing speed can be made high. On the other hand, the assembly language has disadvantages that the work of programming is complicated, the meaning of the program is difficult to understand, the number of lines of the program list is large, and so on, because it is necessary to form the program by stating the hardware operation step by step. Accordingly, there arise the following problems.

(1) It is difficult for programmers, other than few programmers capable of treating an assembly language, to form and change a control program, and it takes a long time for verification of the control program.

(2) Since an assembly language has no compatibility between microcomputers different in architecture from each other, it is necessary to reform the whole program when the kind of a microcomputer is changed, and in order to modify or change a program it is necessary to provide equipment having an architecture the same as that of the microcomputer in which the program is being used. This makes it difficult to immediately change a program which is being subject an operation test in a laboratory or in outdoor laboratory work.

(3) It is difficult to record data in a microcomputer in laboratory work for operation verification and to incorporate a function for externally indicating the data into the microcomputer because of the limitation of the memory capacity, and therefore it is difficult to verify the response property and to determine the specification.

(4) Since a program developing apparatus is generally different in architecture from final products of microcomputers, it is necessary to change a part (particularly a part relating to input/output processing) of a program which has been subject to operation verification on the program developing apparatus, at the time when the program is incorporated into the final products. Accordingly, not only the workability, but also the reliability of the program may be lowered.

SUMMARY OF THE INVENTION

It is therefore an object of the present invention to provide a car built-in type one-chip microcomputer, in which even an ordinary programmer who has never been well trained to work in an assembly language can easily perform formation, change, and verification of a control program, in which it is not necessary to change a control program even when the kind of the microcomputer is changed, in which a program can be easily changed in laboratory work, and in which a program formed in a program developing apparatus can be used as it is in the microcomputer.

The above object of the present invention can be attained by stating a control program in a high level language, by making an operating system (hereinafter abbreviated to "OS") of a program developing apparatus common in specification to that of a control program, by making a control program run on a program developing apparatus to thereby make it possible to directly control an apparatus to be controlled, and by providing input processing by a system call operation to the OS.

With the recent progress of the integration technique, it has become possible to mount a large capacity ROM and RAM on a car built-in type one-chip microcomputer and to improve the processing speed (16-bit and it has become possible to utilize a program given in a high level language on 32-bit microcomputers), and such a car built-in type one-chip microcomputer. Accordingly, if a control program is stated in a high level language, not in a conventionally used assembly language, it becomes possible for a programmer other than those specifically trained to easily perform formation and change of a control program, because the contents of a program stated in a high level language can be easily understood, and the programming can be easily performed. Further, the development, maintenance and verification of a program become easy because the number of lines of the program is reduced by several tenths or one twentieth compared with that of a program stated in an assembly language. Further, if a compiler matched with the microcomputer to be used is mounted, it is possible to change the kind of the microcomputer without changing the control program because a high level language has compatibility among any kinds of microcomputers.

Further, the OS of the program developing apparatus is made common in specification to that of the microcomputer, to thereby make the control program operation environment the same between the program developing apparatus and the microcomputer, so that a control program which has been verified on the program developing apparatus can be incorporated as it is onto a controller without performing any change on the control program. Accordingly, work to change a part of the control program in accordance with the controller becomes unnecessary, so that the time taken for work can be shortened and mistakes can be prevented. Since an apparatus to be actually controlled can be directly controlled by a program provided in the program developing apparatus, a large capacity of RAM, another storage device, and input/output functions with external devices of the program developing apparatus can be effectively used so that record and analysis of desired data and change of a program in laboratory work on a vehicle or the like can be performed easily by use of those functions.

Further, system call to the OS is used for input/output processing of a control program so that a difference in address or a difference in processing procedure at the input/output portion between a program developing apparatus and a microcomputer is all covered by the OS so as not to be viewed from on the control program. Accordingly, it is possible to use the same control program independently of the kind of the microcomputer, the parts used, and the configuration of the program developing apparatus.

DESCRIPTION OF THE PREFERRED EMBODIMENTS

Figure 2:
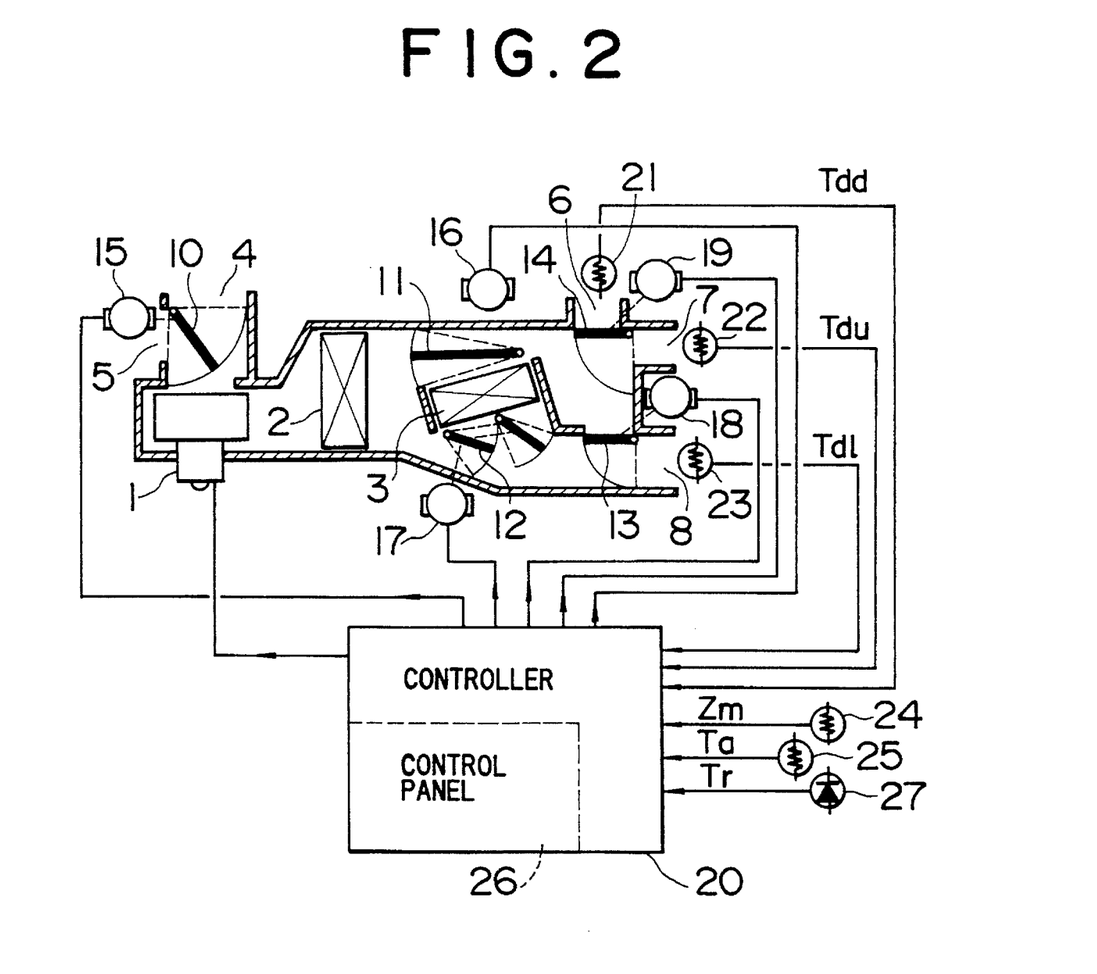
FIG. 2 is a view showing the whole configuration of a car air conditioner and a controller therefor.

The present invention will be described in detail hereafter, by way of example, with reference to a one-chip microcomputer for controlling a car air conditioner. FIG. 2 shows the whole configuration of an air conditioner. Air sucked through an outside air suction inlet 4 or an inside air suction inlet 5, in accordance with the opening of an intake door 10, is sent by a blower motor 1 into an evaporator 2 so as to be cooled therein. Next, the cool air passed by a heater core 3 in accordance with the openings of upper and lower air mixing doors 11 and 12 and the cool air passed through the heater core 3 so as to be heated again thereat are mixed with each other on the downstream side, and the thus mixed air is blown-out as warm conditioning air into a car interior through a defrost outlet 6 (toward front glass), a vent outlet 7 (toward the upper half of the body of an occupant), and a floor outlet 8 (toward the feet of the occupant) in accordance with the openings of floor and vent doors 13 and 14 for changing-over the outlets, thereby controlling the temperature in the car interior.

Receiving detection signals from a defrost duct sensor 21 for detecting the temperature of the blown-out air at the defrost outlet 6, a vent duct sensor 22 for detecting the temperature of the blown-out air at the vent outlet 7, a floor duct sensor 23 for detecting the temperature of the blown-out air at the floor outlet 8, an outside air temperature sensor 24 for detecting the air temperature outside the car interior, a car interior temperature sensor 25 for detecting the air temperature in the car interior, and a sunshine sensor 27 for detecting the intensity of sunshine respectively, a controller 20 controls motor-driven actuators 15–19 for adjusting the openings of the doors 10–14 respectively and the blower motor 1. The controller 20 has a control panel 26, the control panel 26 being provided with switches, which can be operated by an occupant so as to perform various air conditioning operations, and an indicator for informing the occupant of the operating condition of the air conditioner.

Figure 3:
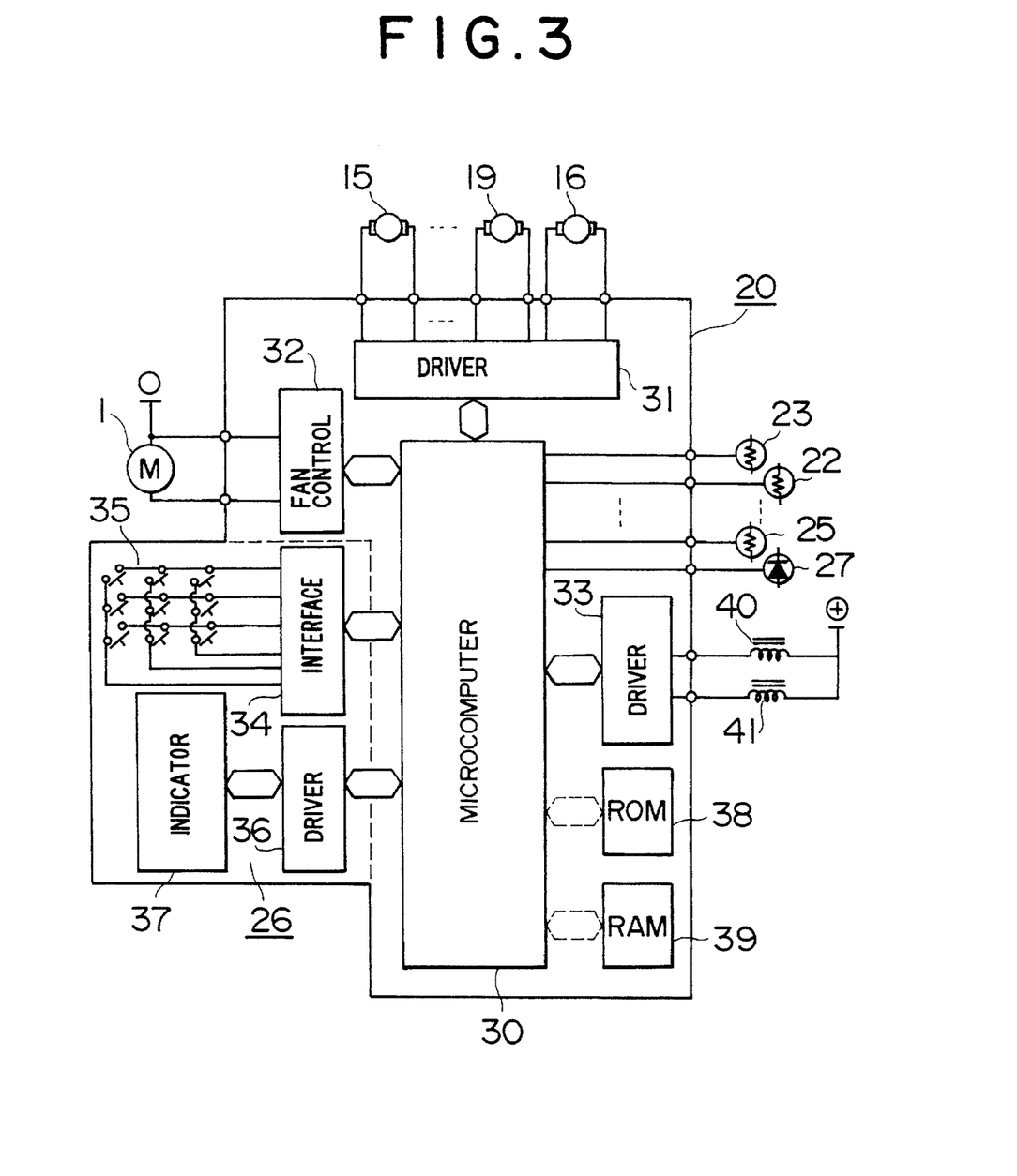
FIG. 3 is a block diagram showing an example of the internal configuration of the controller.

FIG. 3 shows the configuration of the controller 20 more in detail. In FIG. 3, items the same as or equivalent to those in FIG. 2 are referenced correspondingly. In FIG. 3, however, in addition to those components shown in FIG. 2, there are provided, as loads for the controller 20, a compressor relay 40 for turning on/off a compressor and a negative pressure valve 41 for performing open/close control of the flow of engine cooling water, the relay and the valve being omitted in the illustration in FIG. 2.

A one-chip microcomputer 30 in the controller 20 is provided with a processing unit, a ROM, a RAM, an I/O port, an A/D converter, and the like, all of which are omitted in the illustration in FIG. 2. A driver 31 controls rotation (forward rotation, reverse rotation, and stoppage) of motor-driven actuators 15–19, a fan control circuit 32 controls a voltage to be applied to an air cooling blower motor 1, and a solenoid driver 33 performs on/off control for the compressor relay 40 and the negative pressure valve 41 which are external solenoids.

A ROM 38 for storing programs and controlled parameters and a RAM 39 for storing data are connected to each other in the inside of the controller 20, the ROM 38 and RAM 39 being operated on the basis of instructions from the one-chip microcomputer 30. If the ROM and RAM in the microcomputer 30 have sufficient memory capacity, however, the ROM 38 and the RAM 39 may be omitted.

Signals from operation switches 35 on a control panel 26, incorporated in the controller 20, are applied to the microcomputer 30 through an interface circuit 34. On the other hand, the present operating condition of an air conditioner, a set target temperature, and the like are supplied to an indicator 37 through an indicator driver 36 so as to be indicated to an occupant.

Figure 4:
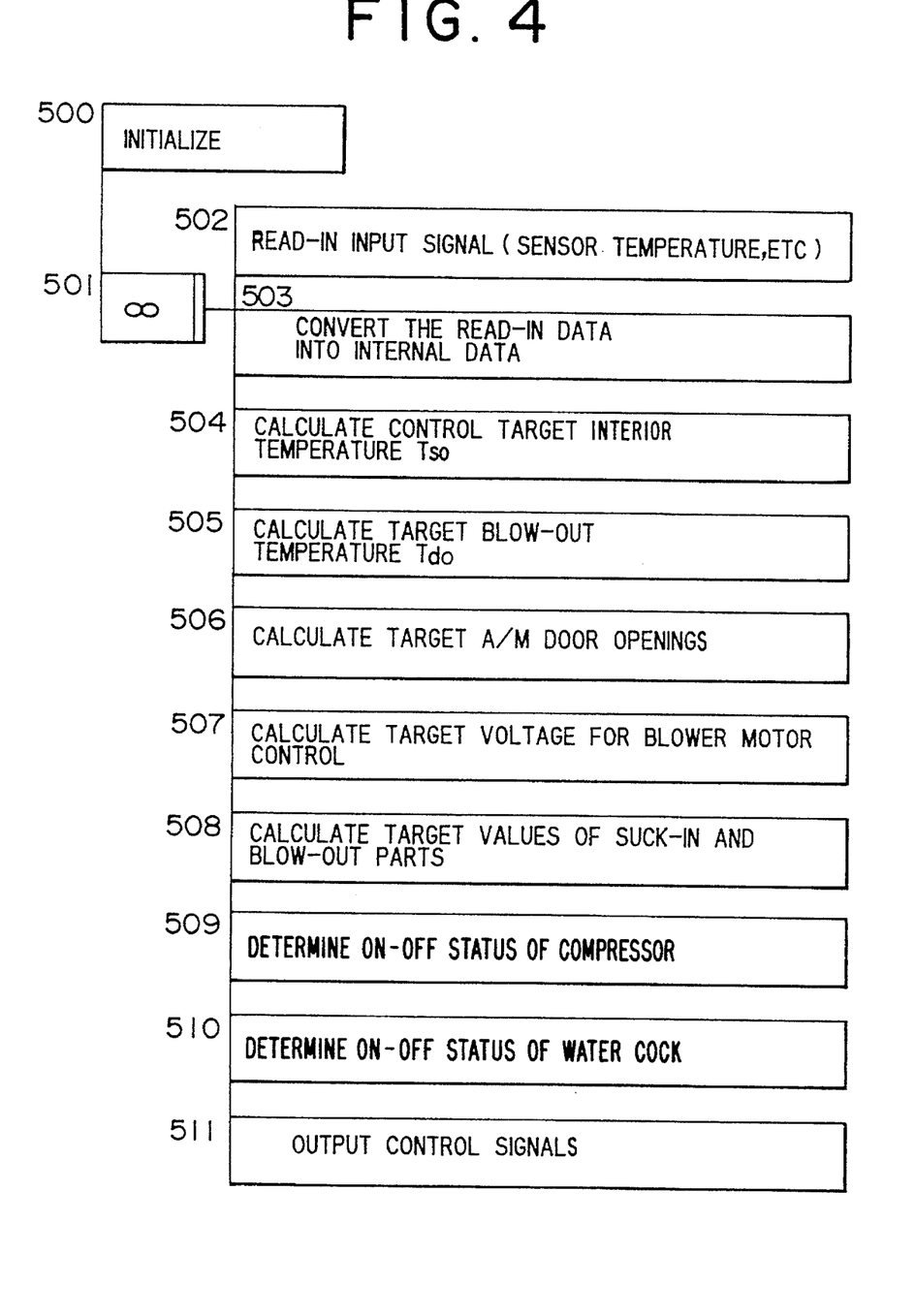
FIG. 4 is a flow chart showing the outline of the procedure for controlling the car air conditioner.

FIG. 4 is a flowchart for explaining an example of the control program to be executed by the microcomputer 30. First, initializing of a register and the RAM in the inside of the microcomputer 30 is performed so that input/output environment for the air conditioning system is regulated in a step 500. Next, by the repeated processing of a step 501, actual control steps 502–511 for the air conditioner system are repeatedly executed till the power source is turned off. That is, temperature signals and the like supplied from various sensors 21–25 and 27 and the like are read into the one-chip microcomputer 30 in the step 502, and correction of the non-linearity of the sensors, conversion of units, or the like is performed with respect to the data such as temperature signals and the like read-in in the preceding step so that the read-in data are converted into internal data in the step 503. Next, a control target temperature $T_{so}$ which is a target temperature for the car interior is calculated in the step 504. The calculation is performed so as to correct a set temperature selected by an occupant in accordance with the outside air temperature and an operating mode so that a comfortable temperature space can be maintained without requiring any adjustment operation by the occupant. Next, a target blow-out temperature $T_{do}$ necessary for maintaining a comfortable temperature level is calculated not only in accordance with a deviation of an actual car interior temperature $T_r$ detected by the car interior temperature sensor 25 from the control target temperature $T_{so}$ but also as in accordance with values of the outside air temperature $T_a$ and intensity of sunshine $Z_m$ in the step 505. Next, the openings of the air mixing (A/M) doors 11 and 12 are calculated in the step 506. In this step are calculated the openings of the air mixing doors 11 and 12 necessary for approximating zero a deviation of an actual blow-out temperature $T_d$ detected by the corresponding duct sensors 21, 22, and 23 in accordance with each of blow-out modes from the target blow-out temperature $T_{do}$ calculated in the preceding step.

Thus, the calculation concerning temperature control is completed. Next, a target blower motor control voltage is calculated so as to determine the quantity of air to be blown out in the step 507. In this step, generally, the calculation is performed in a manner so that the quantity of air is made small when a deviation of an actual car interior temperature $T_r$ from the control target interior temperature $T_{so}$ is substantially zero, while the quantity of air is increased as the deviation becomes large. Next, the most suitable distribution between the quantities of air of the outlets 6–8 is determined in accordance with the outside air temperature $T_a$, the quantity of sunshine $Z_m$, the blow-out temperature $T_d$, and the like, and the quantity of inside air to be circulated is determined in accordance with a thermal load in the step 508. Next, the on/off state of the compressor is determined in the step 509. Generally, judgment is made so that the compressor is forced to turn off under the low outside air temperature condition where the thermal load is low (the relay 40 is operated). Further, the close/open state of the water cock (negative pressure valve) for performing open/close control on the flow of water for cooling the engine, which is a heat source, is determined in the step 510. Finally, control output signals calculated as described above are supplied at the same time to the actuators and the like to thereby control the openings of the air mixing doors, the voltage to be applied to the blower motor, the states of the doors for the suction inlet and blow outlet, the on/off operations of the compressor and water cock, and the indicator and the like on the control panel in the step 511. The foregoing steps 502–511 are repeatedly executed so that the car interior is maintained in a comfortable state in accordance with the condition set by the occupant.

Figure 5:
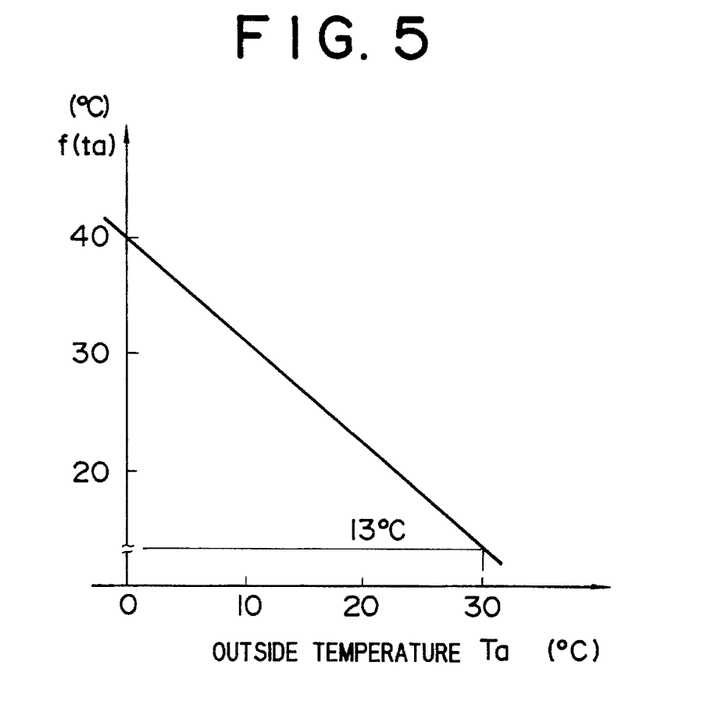
FIG. 5 is a view showing an example of characteristics of a reference blow-out temperature.

Description will be made hereunder as to an example of the program which is a feature of the present invention, by taking the steps 505 and 509 of FIG. 4 as an example. First, an example of the operational expression for the target blow-out temperature $T_{do}$ in the step 505 is shown as follows.

$$\begin{aligned} T_{do} &= f(T_a) - K_z \cdot Z_m + K_r(T_{so} - T_r) \\ &= 40 - K_a \cdot T_a - K_z \cdot Z_m + K_r(T_{so} - T_r) \end{aligned} \quad (1)$$

where
$f(T_a)=40-K_a \cdot T_a$: reference blow-out temperature
$T_a$: outside air temperature
$Z_m$: quantity of sunshine
$T_{so}$: control target interior temperature
$T_r$: car interior temperature
$K_a$, $K_z$, $K_r$: controlled parameters The reference blow-out temperature $f(T_a)$ means a blow-out temperature at which an occupant feels the most comfortable riding when there is no sunshine and the car interior temperature $T_r$ has reached the control target interior temperature $T_{so}$. Further, the reference blow-out temperature $f(T_a)$ has a characteristic in which it substantially linearly becomes lower as the outside air temperature $T_a$ becomes higher as shown in FIG. 5.

When the operation of the expression (1) is programmed by using the conventional assembly language, first, memory areas corresponding to program variables are defined on the RAM. In order to control a car air conditioner, it is necessary to prepare a memory area of about two bytes for each variable in accordance with a range of temperature changing and requirement for resolution of the temperature changing range. Accordingly, a memory area of two bytes is defined for each of the outside air temperature $T_a$, the quantity of sunshine $Z_m$, the car interior temperature $T_r$, the control target interior temperature $T_{so}$, and the target blow-out temperature $T_{do}$ as shown in FIG. 6B. Since the variables to be calculated at this time have already been calculated except the temperature $T_{do}$ in the steps 503 and 504 and the values have been stored in the defined areas, the operation for the expression (1) is executed by using the values on the basis of the flowchart of FIG. 6A. That is, the reference blow-out temperature $(40-K_a \cdot T_a)$ is calculated, and the result of the calculation is temporarily stored in the area defined for the temperature $T_{do}$ in a step 600. Here, A→B in the drawing means that A is obtained and substituted for B. Next, the correction value $K_z.Z_m$ of the target blow-out temperature $T_{do}$, corresponding to the quantity of sunshine $Z_m$, is subtracted from the value of $T_{do}$ obtained in the step 600, and the result of the calculation is stored in the area defined for the temperature $T_{do}$ again in a step 601. Next, $K_r(T_{so}-T_r)$ which is the correction value of the target blow-out temperature $T_{do}$ determined on the basis of the interior temperature deviation, is added to $T_{do}$ obtained in the step 601, and the result of the calculation is stored in the area defined for $T_{do}$ again in a step 602. By execution of the foregoing procedure, the target blow-out temperature data $T_{do}$ calculated through the foregoing expression (1) are obtained in the area defined for $T_{do}$. In each of the steps, however, it is necessary to multiply two-byte length data to each other. In the case of the conventional 8-bit microcomputer, therefore, it is necessary to use a subroutine for double-length multiplication in each of the steps. Since the double-length multiplication method is well known, detailed explanation thereof is omitted. However, it is necessary that multiplication of one-byte length data be performed four times, and the results of the multiplication after digit arrangement are added to each other, the resultant having a four-byte length. Therefore, it is necessary to prepare a memory area corresponding to this resultant.

Figure 6A:
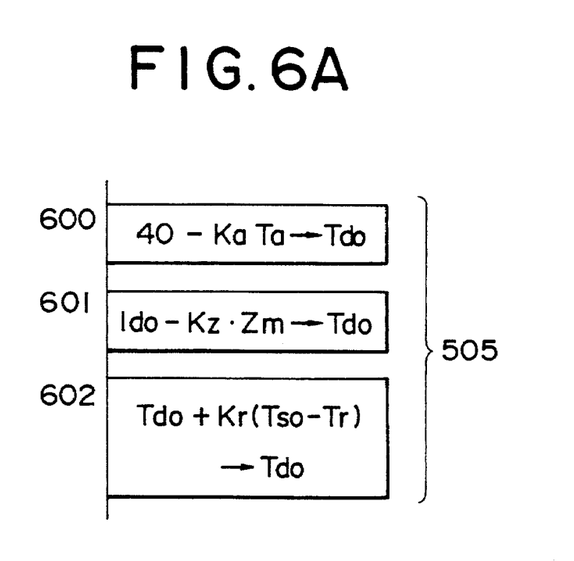
FIGS. 6A and 6B show procedures for calculating a target blow-out temperature.
Figure 6B:
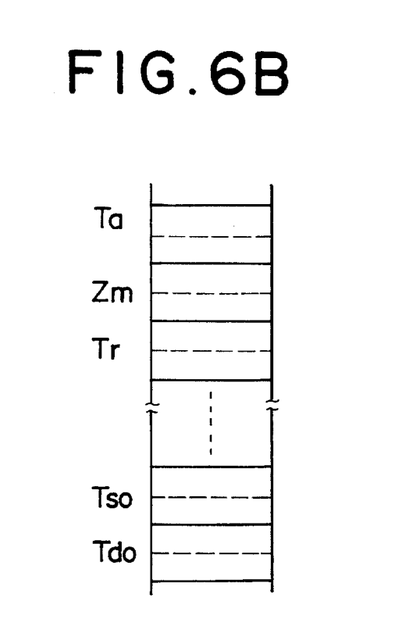
Figure 7A:
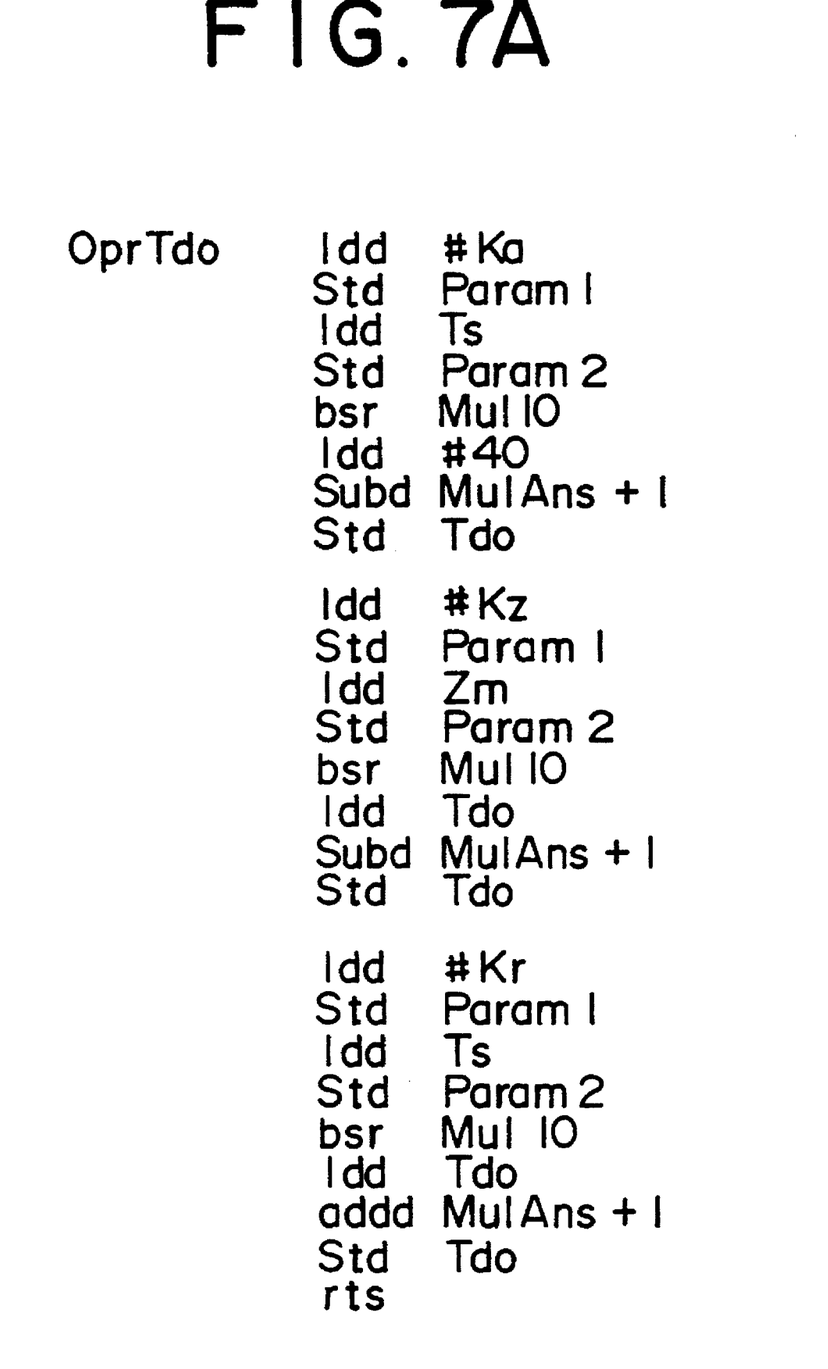
FIGS. 7A and 7B show examples of programs obtained by stating the target blow-out temperature procedures in an assembly language.
Figure 7B:
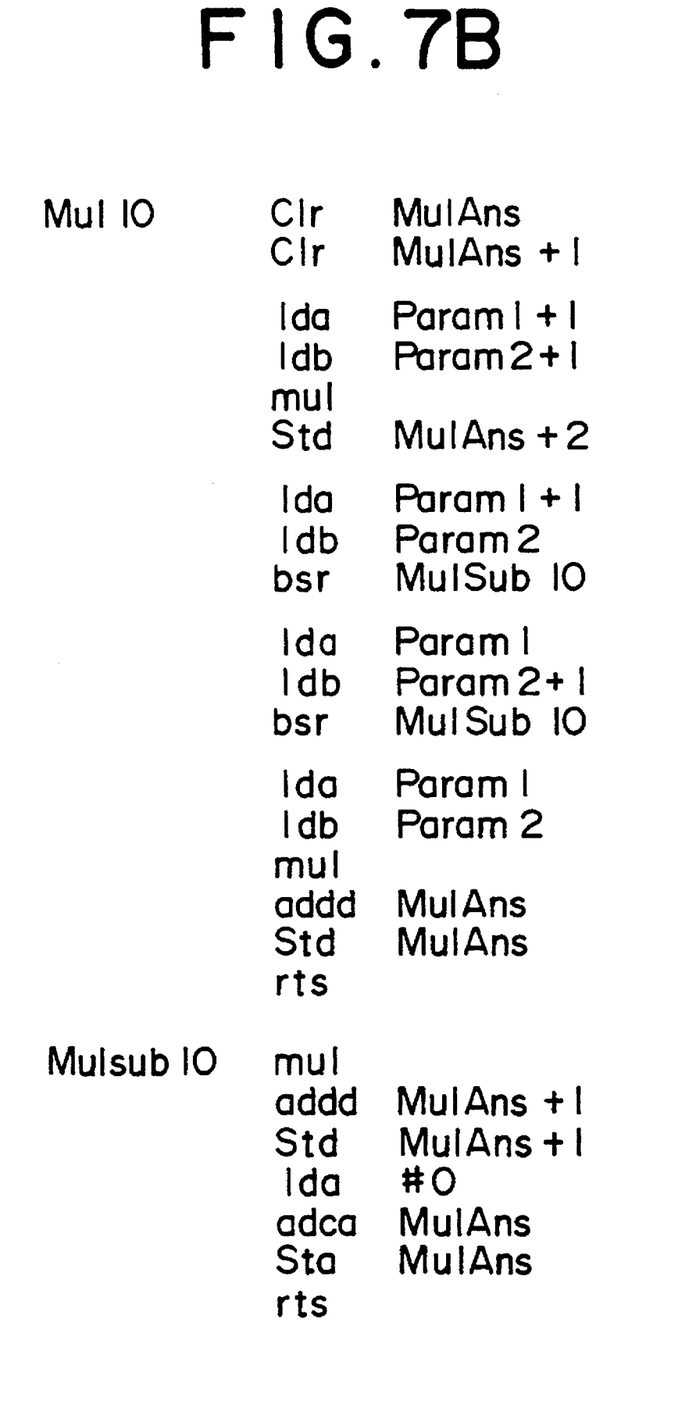

FIGS. 7A and 7B show an example of the program list in which the foregoing processing for the expression (1) is stated in an assembly language, FIG. 7A showing the program of FIG. 6A for executing calculation of the expression (1), FIG. 7B showing a subroutine for 2-byte length multiplication to be used in the program. This list is an example in the case of using a 8-bit one-chip microcomputer HD 6801 produced by Hitachi Ltd., and includes about 50 lines in all. In this example, however, it is difficult to understand the contents of the program at a glance at the program list, and it takes, therefore, a long time to partially change the operational specification of the program with no mistake. Because the microcomputer HD 6801 illustrated in this example is provided with an adding/subtracting function between two-byte data, a program can be incorporated into the microcomputer relatively easily in fact. In the case of using a microcomputer HD 6805 which is also provided by Hitachi Ltd. and which is frequently used for controlling a car air conditioner, the program is longer and more complicated because the microcomputer has no adding/subtracting function between two-byte data.

Figure 1:
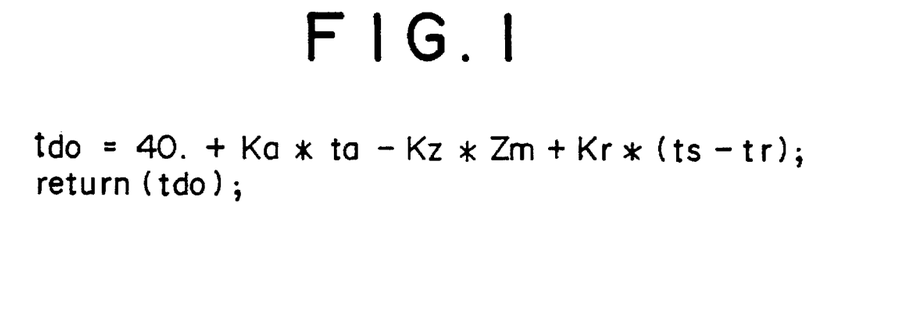
FIG. 1 shows an example of a control program according to a feature of the present invention.

In order to solve such a problem involved in the assembly language, according to the present invention, the calculation of the expression (1) is stated in a high level language. FIG. 1 shows an example in which the expression (1) is stated in the C language which is widely used for microcomputer control. As is apparent from FIG. 1, the program per se is extremely simple, and the statement of the program per se is substantially the same as the expression (1), so that formation of the program and change of the operational specification can be done very easily in comparison with the case of using an assembly language.

Figure 8:
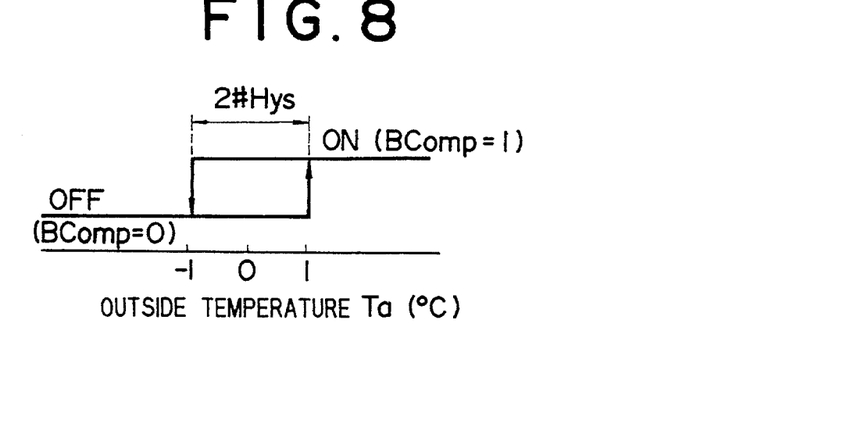
FIG. 8 is a view showing an example of on-off characteristics of a compressor.

Next, description will be made as to comparison of the compressor on/off control program in the step 509 of FIG. 4. FIG. 8 shows an example of the character of the compressor on/off control. When the outside air temperature $T_a$ is in the vicinity of 0° C., generally, the compressor is forced to turn off, because it is not necessary to cause the compressor to operate at a low outside air temperature as described above, and in order to prevent compressor damage due to operation under a low thermal load. In order to prevent chattering at a change-over point due to fine variations of the detection signal of the outside air temperature sensor, on/off control is performed with hysteresis in such a manner that the compressor is turned on when the outside air temperature is not lower than $\#H_{ys}$ (1° C. in FIG. 8), while the compressor is turned off when the outside air temperature is not higher than $-\#H_{ys}$.

Figure 9A:
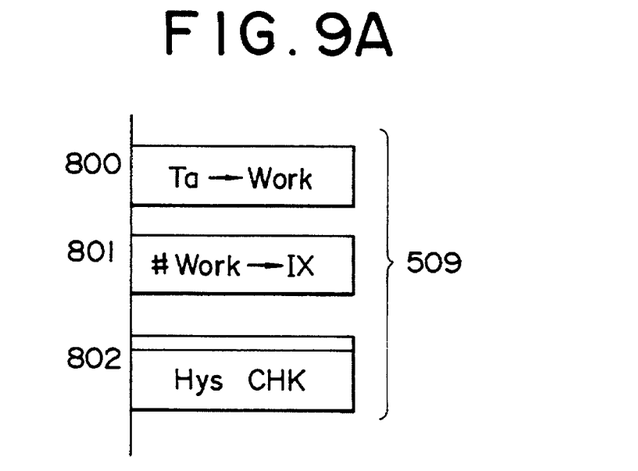
FIGS. 9A, 9B, 10A and 10B are flow charts showing on-off judgment procedures for the compressor.
Figure 9B:
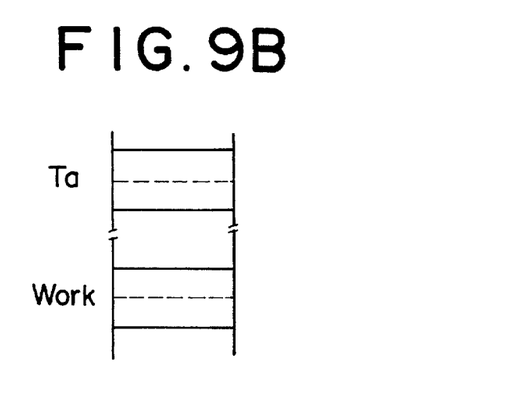
Figure 10A:
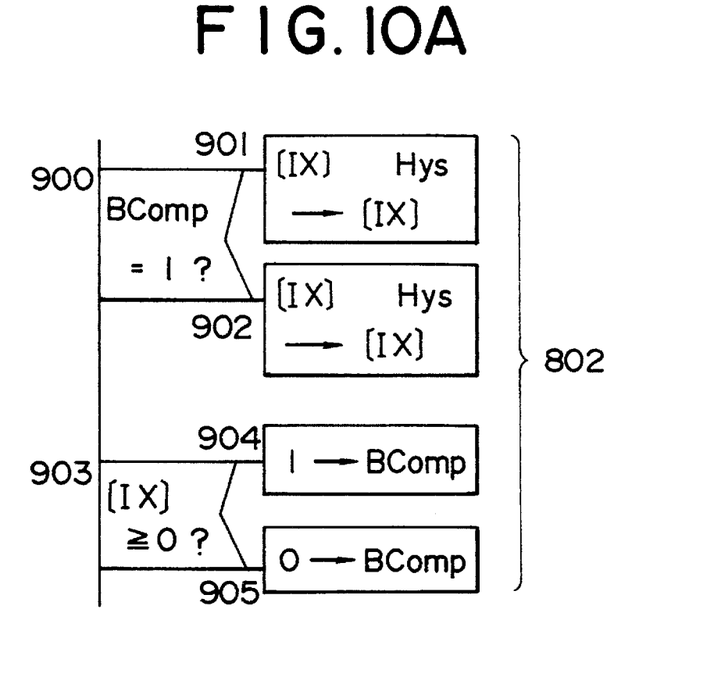
Figure 10B:
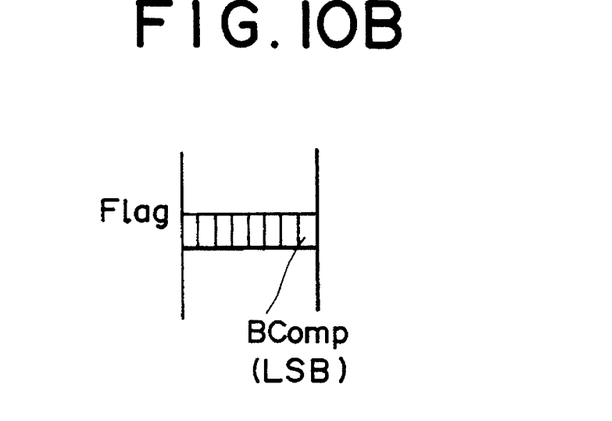

FIGS. 9A and 9B and FIGS. 10A and 10B are flowcharts for executing the processing of the step 509 of FIG. 4. First, referring to FIGS. 10A and 10B, description will be made as to a value judgment subroutine having a hysteresis characteristic (this is made to be in the form of a subroutine because it has general purpose property). FIG. 10B shows a Flag area of the memory in which the one bit of LSB is used as a bit of $B_{comp}$ for storing the on/off state of the compressor. Further, [IX] in FIG. 10A means a value of data stored in an index register IX. That is, [IX] is data of the outside air temperature $T_a$ as to which value judgment with a hysteresis is performed. First, judgment is made as to whether the compressor is at present in its on-state or not in a step 900 of FIG. 10A. If the judgment proves that $B_{comp}$="1", that is, the compressor is in its on-state at present, $T_a+\#H_{ys}$ is substituted for [IX] in a step 901. If the judgment proves that $B_{comp}$="0", that is the compressor is in its off-state at present, on the contrary, $T_a-\#H_{ys}$ is substituted for [IX] in a step 902. Next, judgment is made as to whether [IX] is positive or negative in a step 903. If the judgment proves that [IX] is positive, this judgment means that $T_a-\#H_{ys}>0$ if $B_{comp}$="0" till now while $T_a+\#H_{ys}>0$ if $B_{comp}$="1" till now. As is apparent from FIG. 8, this means the state where the compressor is to be turned on in either case, and therefore $B_{comp}$="1" is set in a step 904. If the judgment proves that [IX] is negative in the step 903, on the contrary, this judgment means that $T_a-\#H_{ys}<0$ if $B_{comp}$="0" till now while $T_a+\#H_{ys}<0$ if $B_{comp}$="1" till now. This means the state where the compressor is to be turned off in either case, and therefore $B_{comp}$="0" is set in a step 905.

FIGS. 9A and 9B show a main program for executing the step 509 of FIG. 4. Since [IX] is necessarily rewritten in the step 901 or 902 of FIG. 10A, it is necessary to set the value of the outside air temperature data $T_a$ into the register IX every time the processing of FIG. 10A is started. Therefore, a working area called "Work" is prepared separately from a $T_a$ storing area. The value of the outside air temperature $T_a$ is copied in the Work area in a step 800 of FIG. 9A, and the address of the Work area, that is, # Work is substituted for the index register in a step 801. Then, the subroutine is called in a step 802.

Figure 11A:
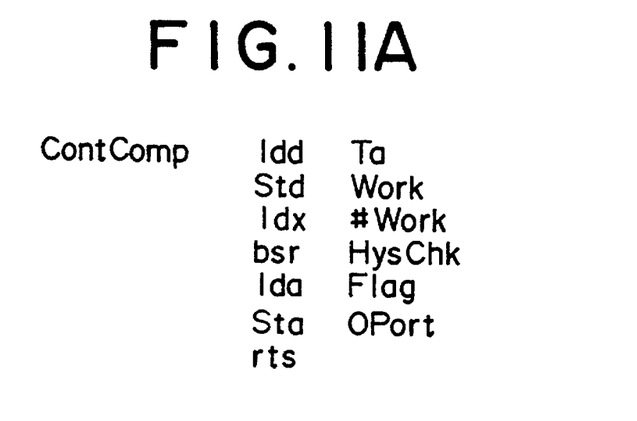
FIGS. 11A, 11B and 12 show examples of programs obtained by stating the on-off judgment procedures in the assembly language and the C language.
Figure 11B:
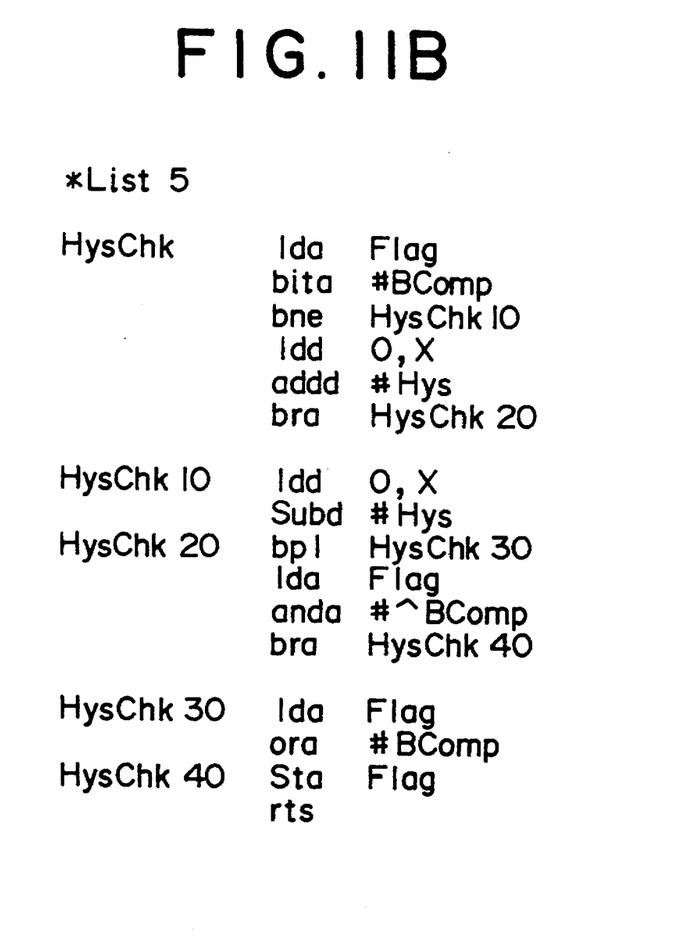

FIGS. 11A and 11B show lists in which the processing of FIGS. 9A and 9B and FIGS. 10A and 10B is stated in an assembly language. Although the number of program lines in the lists is greatly reduced in comparison with the foregoing list of FIGS. 7A and 7B, it is still very difficult to read, only from the lists, what processing a program is executing.

Figure 12:
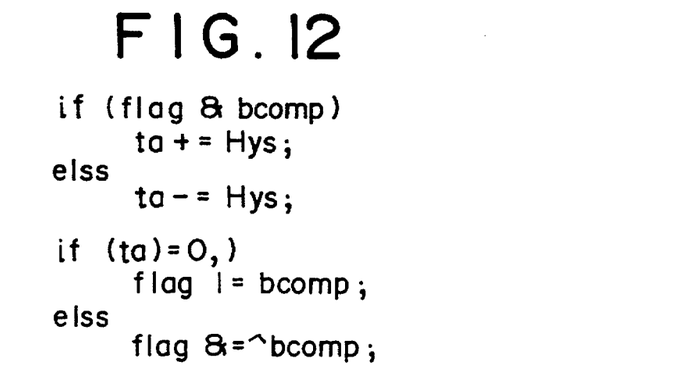

FIG. 12 shows an example of the program in the case where the foregoing judgment processing in the step 509 is stated in the C language. In this example, the number of lines of the program is not reduced in comparison with the conventional cases of FIGS. 11A and 11B. However, any engineer handling the C language can easily understand the contents of the program and can easily change the characteristic thereof.

In the foregoing embodiments of FIGS. 1 and 12 as stated above, there are various effects in that by stating a control program in the C language which is a high level language, the number of lines of the program statement can be reduced (particularly the number of processing of numerical value operation can be reduced), the contents of the program can be easily understood, and change of the specification of the program and verification of the operational contents can be easily and accurately performed. Further, almost all general purpose microcomputers are supplied in advance with a good-quality compiler for a representative high level language such as the C language or the like, and, therefore, if an exclusive compiler is mounted on each microcomputer, the same control program can be used for all the microcomputers, even in the case where the microcomputers are different in structure from each other.

On the contrary, there are disadvantages in that it is necessary to provide an area for storing a compiler and a translated target program (machine language), and it cannot be avoided that the target program has a slightly inefficient command row because the target program is automatically translated on the basis of the compiler so that usually a processing speed is lower than that of a program formed by using an assembly language. The increase of the memory capacity and the reduction of the processing speed can be sufficiently absorbed by the progress of hardware as described above.

Figure 13:
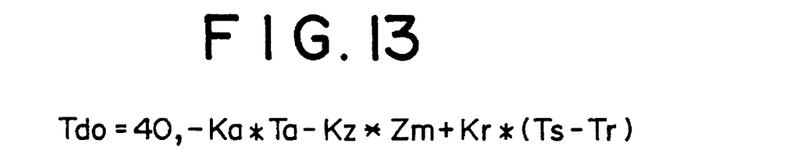
FIGS. 13 and 14 show examples of programs written in the BASIC language for performing the judgment processing for the control on the target blow-out temperature and on the control of the compressor.
Figure 14:
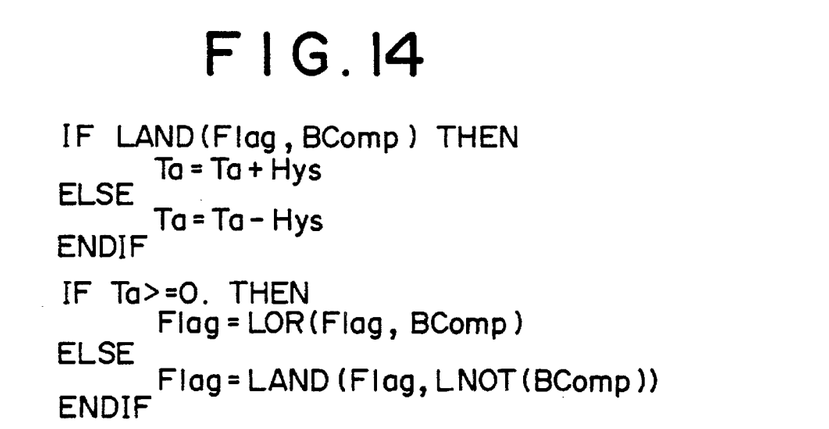

FIGS. 13 and 14 respectively show, as further embodiments of the present invention, examples in which calculation of the operational expression (1) and on/off judgment processing for the process of FIG. 8 are stated in the high level language BASIC. Compared with the foregoing embodiments of FIGS. 1 and 12 using the C language, the embodiments of FIGS. 13 and 14 are substantially the same as those of FIGS. 1 and 12 in the number of lines of program as well as in the easiness in understanding, and have the same effects as those in the case of using the C language. Further, the ]BASIC language is widely used as a language for personal computers, and expands the range of persons capable of performing formation and change of programs in comparison with the case of using the C language. Moreover, the BASIC language is called an interpreter language, and a program stated in the BASIC language can be temporarily stopped even in a program executing environment state so that change-or addition of the program can be easily performed. Therefore, there is an effect that the present invention can immediately cope even with specification correction on the way of development of the program specification.

Although, generally, the processing speed of the BASIC language is low, the problem concerning the processing speed has gradually been solved by an improvement of the processing ability of microcomputers. Further, a microcomputer in which a BASIC interpreter, for directly executing a BASIC program, is built is developed, and required ROM capacity and processing speed are further improved. Moreover, in the BASIC language, there are various systems, for example, an intermediate code (I code) interpreter system, a compiler system similar to the C language, and so on, and by using the BASIC language of such a system, it is possible to make programs compact and to make program processing speed high.

Any one of other high level languages can be applied in the same manner as the foregoing cases. Further, it is possible to design and use a high-speed and compact high level language for exclusive use for car control and air conditioner control.

Figure 15:
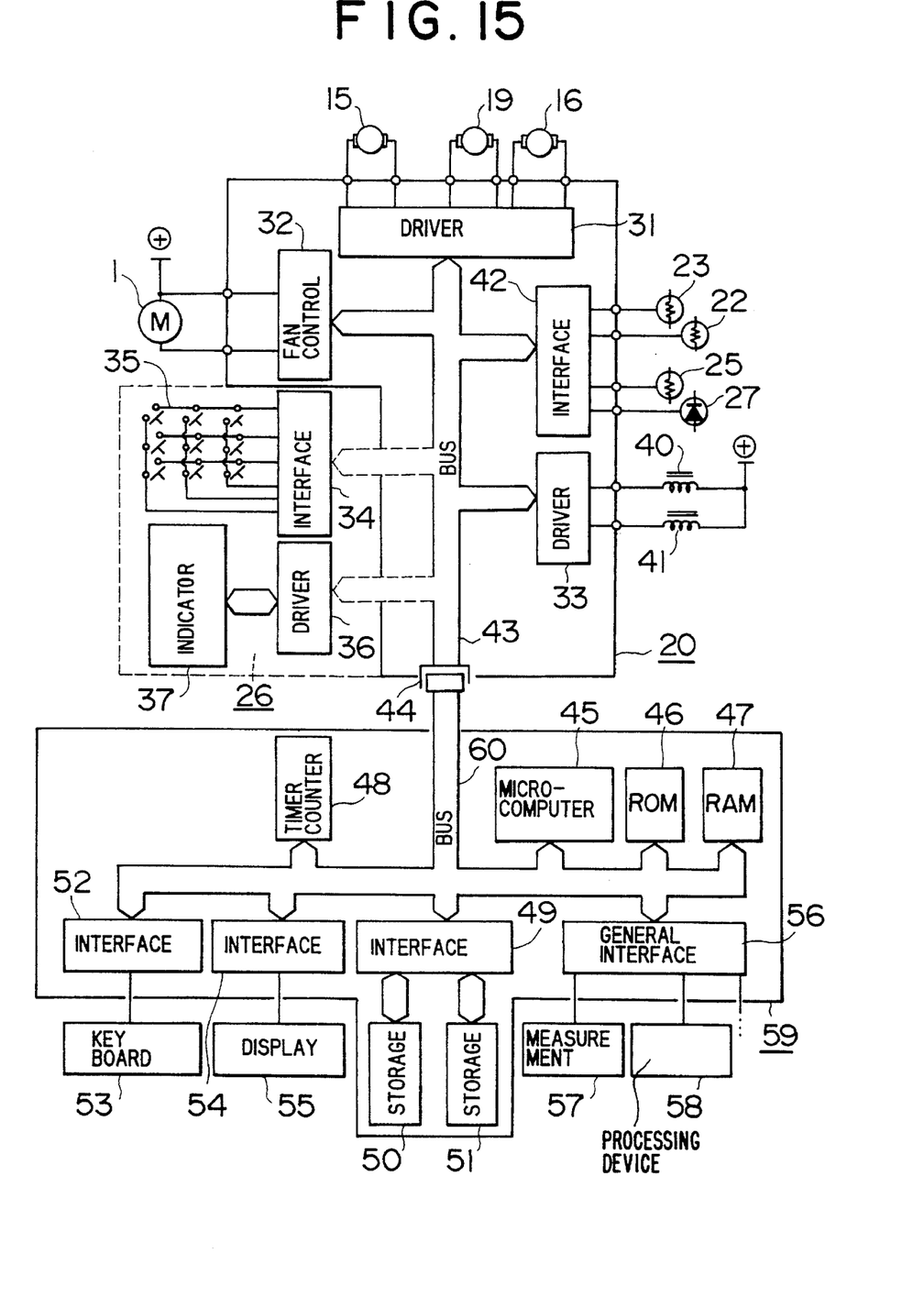
FIG. 15 is a block diagram of an embodiment of the program developing apparatus according to a feature of the present invention.

FIG. 15 shows another embodiment of the present invention in which a program developing apparatus and a car air conditioner are connected to each other to thereby perform air conditioner control by a program stated in an assembly language or a high level language and mounted on the program developing apparatus. Here, the term "program developing apparatus" means an apparatus which is provided with functions such as an editor to be used for formation, correction, etc. of a program, a compiler for translating the formed high level language program, an assembler for translating the formed assembly language program, a debugger for performing check or evaluation, an emulator, and so on to thereby perform formation, correction, etc., of an OS and a control program for a car built-in type one-chip microcomputer.

In FIG. 15, the upper block shows the inside configuration of the controller 20 in the air conditioner of FIG. 2 which is different from that illustrated in FIG. 3 in that the car built-in type one-chip microcomputer 30 is replaced by signal lines led out through a bus line 43 from an interface circuit for various input/output terminals and from various divers, and in that another interface 42 is provided at an input portion from the various sensors 23–25 and 27.

On the other hand, the lower block in FIG. 15 shows the inside configuration of a program developing apparatus 59 which is constituted by a microcomputer 45, a ROM 46, a RAM 47, a timer counter 48, storage devices 50 and 51 (a floppy disk, a hard disk, an optical disk, a bubble memory, or the like), a key board 53, a display unit 55, an externally connected general purpose measuring instrument 57, a processing device 58 (a printer, a plotter, a data logger, an EPRM writer, or the like), interface circuits 49, 52 and 54, a general purpose interface circuit 56 (RS-232C, or the like) for connecting the program developing apparatus 59 to external general purpose devices, and a bus line 60. The bus line 60 is connected to the bus line 43 of the controller 20 through a connector 44.

As illustrated in the above configuration, the program developing apparatus 59 is loaded with a real time multi-task OS and is provided with the large capacity RAM 47 and the large capacity storage devices 50 and 51, so that the program developing apparatus 59 is able to operate on the real time OS to perform functions such as an editor necessary for program development, various assemblers, a compiler and an interpreter for high level languages including the C language, the BASIC language, and the like, etc. The controller 20 can be controlled directly by the microcomputer 45 through the bus lines 60 and 43. Further, the program developing apparatus 59 is arranged so as to be operated by an AC 100 V power source as well as by a car DC power source. Accordingly, it is possible that a control program for air conditioner control is formed with an assembly language or a high level language by using this program developing apparatus, and the formed control program is made to run on the microcomputer 45 to thereby directly control the car air conditioner through the controller 20. Particularly in a running test for evaluation of comfortable riding in an actual car, the whole of the system is mounted on the car, so that the air conditioner control is executed by the program developing apparatus 59, and that, by use of the multi-task functions, the data supplied from the various sensors, the operation data inside the control program, the operating conditions of the various actuators, the temperature and pressure data read at various portions of the car through the external general purpose devices, and the like are successively recorded in real time into the storage devices 50 and 51 such as disks to provide for later analysis, and the display unit 55 and the measuring device 57 are made to display or indicate the progress of change of those data in real time to thereby make it possible to perform correction or to recompile the air conditioner control program, if necessary, even in running of the car. Further, in the case of using the program developing apparatus 59, the control panel 26 integrally provided with the controller 20 may be unnecessary in accordance with the kind of the program developing apparatus.

Onto the controller of FIG. 3 which is a final product, it will suffice that a common OS, obtained by removing only the function unnecessary for the final product from the OS used in this embodiment of the program developing apparatus, is mounted. Thus, a control program the operation of which has been verified can be obtained without performing any change.

As representative ones of currently available general purpose OSs, OS9, I-TRON, μ-TRON, various real time OSs supplied by microcomputer manufacturers, etc., may be used as an OS for the program developing apparatus. Alternatively, it is possible to develop a compact and high performance OS for exclusive use for this system.

This embodiment has an advantage that the time required for formation of a control program and change of specification can be extremely shortened, and the quality of the control program can be remarkably improved.

Figure 16:
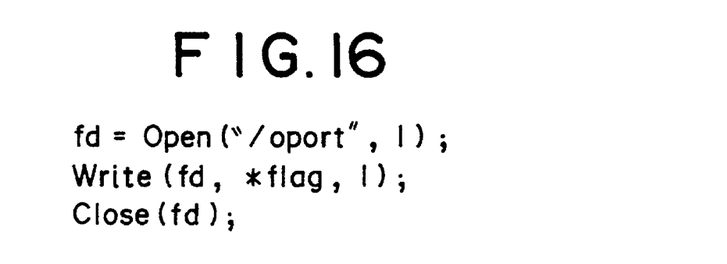
FIG. 16 shows an example of a program for performing input/output by a system call to the OS.

FIG. 16 shows another embodiment in which when input/output of signals or data is performed, control onto an input/output interface address is not performed directly from a program, but input/output is achieved by a system call operation on the OS. This embodiment is an example of a program in which an operation result is outputted from the C language which operates on the OS. That is, a 1-Byte control output including $B_{comp}$ indicating the on/off state of the compressor calculated by the program of FIG. 12 is supplied to an actual input/output port defined as $O_{port}$.

According to this embodiment, even if the address of the input/output port or the input/output procedure varies in accordance with the configuration of the control circuit or the difference in parts used, all the variations can be absorbed in the OS, and the control program including the input/output processing program shown in FIG. 16 can not be affected at all by those variations. Accordingly, even in the case where a control program used in one kind of system is to be used in another kind of system, or in the case where a control program formed in the program developing apparatus shown in FIG. 15 is to be applied to the system shown in FIG. 3 in which input/output address etc. are different from the former, it is possible to use the control program as it is with no change, so that there is an advantage that the time required for developing a control program can be extremely shortened and the quality of the control program can be remarkably improved.

Although various embodiments have been described above as to the car air conditioner control, a car built-in type one-chip microcomputer may be used in many fields of control, for example, engine control, and so on, and it is a matter of course that the present invention is applicable to those fields of control.

According to the present invention, there are advantages in that any programmer other than those specifically trained can easily perform formation, change and verification of a control program because by use of a high level language a program can be easily formed and the contents of the program can be easily understood, and in that one and the same control program can be used even if the microcomputer varies in kind or in parts because the structure of the microcomputer is covered by a compiler corresponding to the kind of the microcomputer. There are further advantages in that by making the specification of the OS common to the program developing apparatus and the controller, correction and change can be performed on a control program at a desired location in a way of laboratory work or on an outdoor car in the period of development of products, and the formed control program can be used as it is without any large change in the controllers of the products. Further, in the period of development of products, desired data in the microcomputer can be easily recorded and displayed and analysis of those data (processing, for example, graphically expressing the data) can be automatically performed. Further, by use of system call to the OS for performing the input/output processing of a control program, a difference in address or the like in connection with input/output operation can be absorbed by the OS so that the compatibility of the control program can be made higher. Thus, the present invention has advantages, in addition to those advantages described above, in that it can greatly contribute to the extreme reduction of the time required for development of a control program and for change of specification of the control program, and to the improvement of the reliability of the control program.

I claim:

1. A controller for controlling an air conditioner system in a car, said controller comprising:

a single chip microcomputer, including (i) a memory for storing a control program in machine language after external translation of the control program from a high level language, wherein said control program has been developed by a program developing apparatus, (ii) an input adapted for connection to a sensor of the car air conditioner system for receipt of an input signal therefrom, and (iii) an output, said microcomputer being responsive to receipt of the input signal from the sensor for high-speed execution of the control program and application of a resulting output signal to said microcomputer output; and a driver connected to said microcomputer output, adapted for connection to an actuator of the car air conditioner system, and responsive to the output signal for controlling the actuator to control the car air conditioner system;

wherein an operating system of the program developing apparatus is common in specification to the operating system of the microcomputer so that the control program operating environment will be the same between the program developing apparatus and the microcomputer, so that a control program which has been verified on the program developing apparatus can be incorporated into the microcomputer without performing any change on the control program other than translation into machine language.

2. A controller according to claim 1, wherein the high level language is selected from C language, C++ language, and BASIC language.

3. A controller according to claim 1, wherein the operating system of the microcomputer is capable of real time processing and multi-task processing functions.

4. A controller for controlling an engine system in a car, said controller comprising:

a single chip microcomputer, including (1) a memory for storing a control program in machine language after external translation of the control program from a high level language, wherein said control program has been developed by a program developing apparatus, (ii) an input adapted for connection to a sensor of the car engine system for receipt of an input signal therefrom, and (iii) an output, said microcomputer responsive to receipt of the input signal from the sensor for high-speed execution of the control program and application of a resulting output signal to said microcomputer output; and a driver connected to said microcomputer output, adapted for connection to an actuator of the car engine system and responsive to the output signal for controlling the actuator to control the car engine system;

wherein an operating system of the program developing apparatus is common in specification to the operating system of the microcomputer so that the control program operating environment will be the same between the program developing apparatus and the microcomputer, so that a control program which has been verified on the program developing apparatus can be incorporated into the microcomputer without performing any change on the control program other than translation into machine language.

5. A controller according to claim 4, wherein the high level language is selected from C language, C++ language, and BASIC language.

6. A controller according to claim 4, wherein the operating system of the microcomputer is capable of real time processing and multi-task processing functions.

7. A controller according to claim 4, wherein said input is adapted for connection to a sensor sensing ignition timing of the engine and said driver is adapted for connection to a control for controlling ignition timing of the engine.

8. A controller according to claim 4, wherein said input is adapted for connection to a sensor sensing fuel injection amount in the engine, and said driver is adapted for connection to a control for controlling the fuel injection amount in the engine.

9. A method of controlling a system in a car, utilizing a single-chip microcomputer in the car, said method comprising:

(a) creating in a high-level programming language in a program developing apparatus a control program for controlling the car system;

(b) translating the program, external to the single-chip microcomputer, from the high-level language to a machine language;

(c) storing the control program in the machine language in a memory of the single-chip microcomputer in the car;

(d) receiving an input signal from a sensor of the car system;

(e) in response to the input signal, executing the control program in the machine language at high-speed in the microcomputer to create an output signal; and (f) applying the output signal to a driver connected to an actuator of the car system to control the actuator;

wherein an operating system of the program developing apparatus is common in specification to the operating system of the microcomputer so that the control program operating environment will be the same between the program developing apparatus and the microcomputer, so that a control program which has been verified on the program developing apparatus can be incorporated into the microcomputer without performing any change on the control program other than translation into machine language.

10. A method according to claim 9, wherein the high-level language is selected from C language, C++ language, and BASIC language.

11. A method according to claim 10, wherein the operating system of the microcomputer performs real time processing and multi-task processing functions.

12. A method according to claim 10, wherein the sensor and the driver are connected to the car air conditioning system to control the car air conditioning system.

13. A method according to claim 10, wherein the sensor and the driver are connected to the car engine to control the car engine.

14. A method according to claim 13, wherein said sensor senses ignition timing of the car engine and said driver controls ignition timing of the engine.

15. A controller according to claim 13, wherein said sensor senses fuel injection amount in the engine, and said driver controls the fuel injection amount in the engine.

* * * * *